United States Patent [19]

Heuver et al.

[11] Patent Number: 5,794,748
[45] Date of Patent: Aug. 18, 1998

[54] PARK LOCK MECHANISM FOR AN AUTOMATIC TRANSMISSION

[75] Inventors: Bradley Ronald Heuver, Garden City; Dale Eltinge Martin, Novi, both of Mich.

[73] Assignee: Ford Global Technologies, Inc., Dearborn, Mich.

[21] Appl. No.: 731,634

[22] Filed: Oct. 15, 1996

[51] Int. Cl.$^6$ .................. B60T 1/06; B60K 41/26
[52] U.S. Cl. ................ 192/4 A; 74/411.5; 188/31
[58] Field of Search ............. 192/4 A; 188/31, 188/69; 74/411.5, 577 S

[56] References Cited

U.S. PATENT DOCUMENTS

| | | | |
|---|---|---|---|
| 3,912,050 | 10/1975 | Iwanaga et al. | 188/69 |
| 4,089,394 | 5/1978 | Haupt et al. | |
| 4,223,768 | 9/1980 | Iwanaga | |
| 4,310,081 | 1/1982 | Kolacz | |
| 4,474,085 | 10/1984 | DeVogelaere et al. | |
| 4,614,256 | 9/1986 | Kuwayama et al. | 192/4 A |
| 4,660,443 | 4/1987 | Simancik | |
| 4,667,783 | 5/1987 | Sugano et al. | |
| 4,690,011 | 9/1987 | Sakai et al. | 192/4 A X |
| 4,727,967 | 3/1988 | Ogasawara et al. | 192/4 A |
| 4,907,681 | 3/1990 | Kuusik et al. | |
| 4,916,961 | 4/1990 | Holbrook et al. | |
| 4,982,620 | 1/1991 | Holbrook et al. | |
| 5,295,412 | 3/1994 | Donato et al. | |
| 5,526,909 | 6/1996 | Ohkawa | 192/4 A |

Primary Examiner—Richard M. Lorence
Attorney, Agent, or Firm—Neil P. Ferraro

[57] ABSTRACT

A park lock mechanism for an automatic transmission includes a park apply rod for selectively engaging and disengaging a park pawl with a park gear. The park apply rod is actuated by a plate member having a slot formed therein. The slot defines a cam portion and a lost motion portion whereby the cam portion causes the park apply rod to move longitudinally so as to actuate the park pawl. The lost motion portion limits longitudinal travel of the park apply rod in any gear other than park. A reaction member is also used to limit the degrees of freedom of the park apply rod.

8 Claims, 3 Drawing Sheets

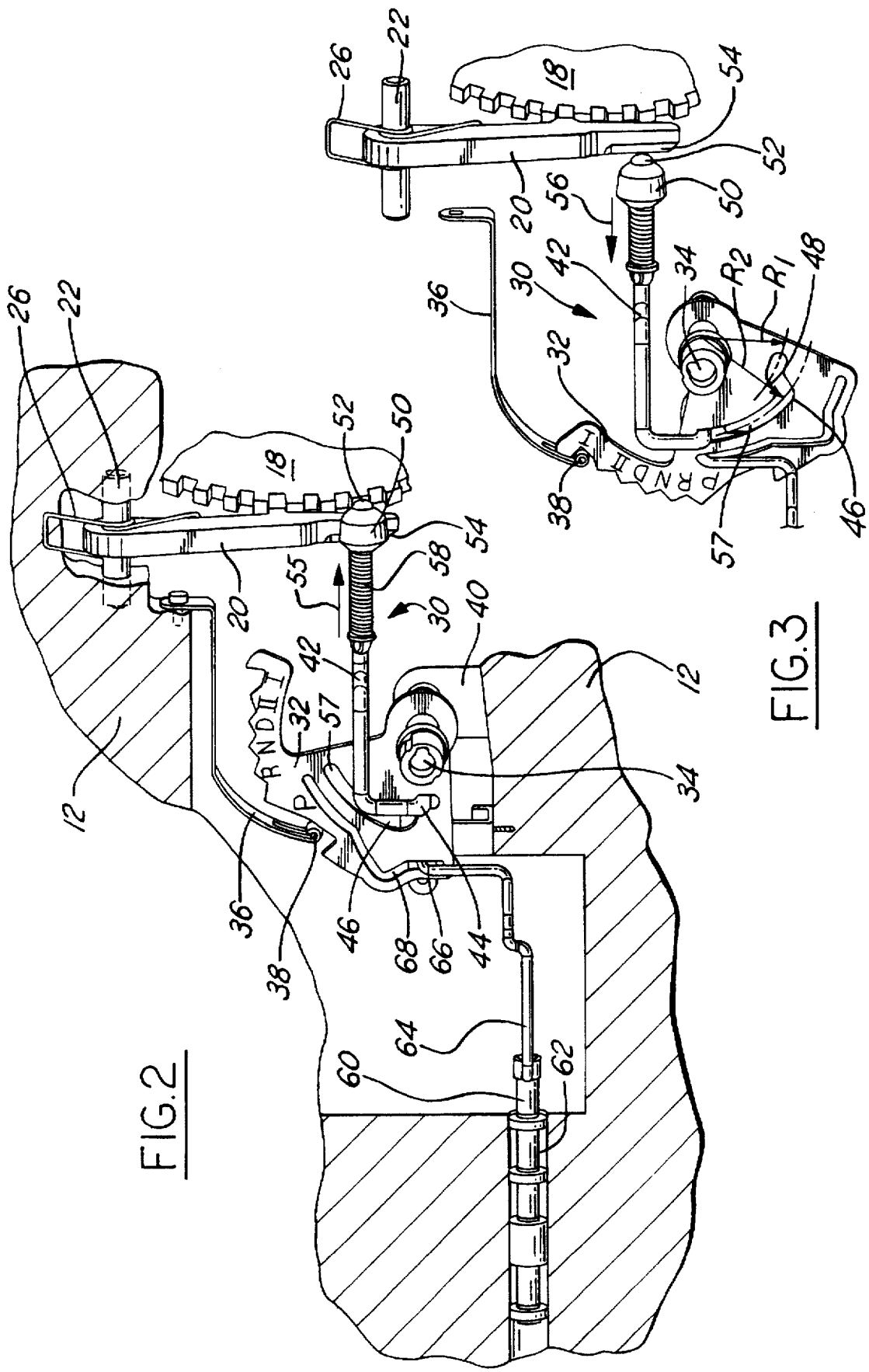

PARK LOCK MECHANISM FOR AN AUTOMATIC TRANSMISSION

FIELD OF THE INVENTION

This invention relates to automatic transmissions and, more particularly, to park lock mechanisms for automatic transmissions.

BACKGROUND OF THE INVENTION

Conventional automotive automatic transmissions are provided with a shift lever to selectively effect a plurality of gear ratios. The shift lever is operatively connected to a manual valve through a linkage arrangement that includes a plate member. When the shift lever moves between positions corresponding to selected gear ratios, the plate member rotates and, in turn, moves the manual valve within a valve body to a position corresponding to the gear ratio selected. The manual valve thereby directs hydraulic fluid to hydraulically engage the gear ratio selected.

The shift lever and plate member also control a park lock mechanism whereby the transmission output shaft is prevented from rotating when the "Park" position is selected. Generally, the park lock mechanism is operated by reciprocating a park apply rod which is pivotally mounted to an outer area of the plate member. A cam member, attached to the end opposite the pivot end, actuates a park pawl. When the "Park" position is selected, the plate member rotates, causing the park apply rod to move longitudinally. The cam member then actuates the park pawl causing the park pawl to pivot. A pawl tooth on the park pawl then meshes with a park gear attached to the output shaft to lock the transmission in "Park". When a gear ratio other than the "Park" gear is selected, the plate member rotates, causing the park apply rod and cam member to move longitudinally to disengage the park pawl. Because the park pawl is spring biased relative to the transmission housing, the park pawl pivots in an opposite direction and disengages from the park gear and the output shaft is free to rotate.

Certain disadvantages with prior art park lock mechanisms exist. For example, packaging issues arise, especially in the case of a front-wheel drive automatic transmission. Generally, a small amount of longitudinal movement of the park apply rod is all that is necessary to cause the park pawl to disengage the park gear. However, because of the amount of plate member rotational movement required to move the manual valve through the range of gear ratios, the park apply rod of a prior art park lock mechanism longitudinally moves well beyond the distance necessary to cause the park pawl to engage and disengage the park gear. To traverse this distance, a park apply rod having a long length is used. In addition, a large amount of angular clearance is required in the transmission housing to accommodate the oscillating motion of the park apply rod due to the pivotal mounting of the park apply rod to the plate member. As a result, a relatively massive housing structure is required to accommodate the large amount of longitudinal movement and oscillating motion of the park apply rod.

SUMMARY OF THE INVENTION

An object of the present invention is to provide a park lock mechanism for an automatic transmission using a park apply rod having controlled oscillating motion such that the park apply rod moves substantially in a longitudinal direction for a predetermined distance and reduces the overall length of the park apply rod.

The above object is achieved and disadvantages of prior art approaches overcome by providing a park lock mechanism for an automatic transmission wherein the park apply rod is actuated by an actuator. The transmission includes a housing, an output shaft rotatably disposed partially within the housing and a park pawl mechanism operatively connectable with and selectively actuatable by the park lock mechanism for permitting and preventing rotation of the output shaft. In one particular aspect of the invention, the park lock mechanism includes a park apply rod longitudinally movably disposed within the housing for selectively actuating the park pawl mechanism. A park apply rod actuator is rotatably mounted within the housing and operatively connectable with the park apply rod. The park apply rod actuator has a cam portion and a lost motion portion, each selectively engageable with the park apply rod upon rotation of the actuator to a certain position for permitting or preventing rotation of the output shaft. As the actuator is moved to the certain position upon rotation of the actuator, the cam portion is operative to drive the park apply rod longitudinally and upon further rotation of the actuator to a position other than the certain position, the lost motion portion is operative to prevent the actuator from driving the park apply rod.

To limit the degrees of freedom of movement of the park apply rod relative to the actuator, a reaction member is provided. The reaction member has a slot formed therein and the second end of the park apply rod is disposed and moveable within the slot. The slot is substantially parallel to the desired direction of motion of the park apply rod such that the park apply rod is constrained to move substantially longitudinally.

In a preferred embodiment, the cam portion and lost motion portion is defined by a slot formed in a plate member rotatably mounted within the transmission housing, with the park apply rod being disposed and moveable with the slot.

Also in a preferred embodiment, a guide member is provided to position the park apply rod relative to the output shaft such that the park apply rod can selectively lock and unlock the output shaft.

An advantage of the present invention is that a park lock mechanism is provided having reduced space requirements within the housing of the automatic transmission.

Another, more specific, advantage of the present invention is that oscillating motion of the park apply rod is substantially reduced.

Yet another, more specific, advantage of the present invention is that the amount of longitudinal travel distance of the park apply rod is limited.

Other objects, features and advantage of the present invention will be readily appreciated by the reader of this specification.

BRIEF DESCRIPTION OF THE DRAWINGS

The invention will now be described, by way of example, with reference to the accompanying drawings, in which:

FIG. 2 is a perspective left side view of the park lock mechanism of FIG. 1 in the engaged position;

FIG. 3 is a perspective left side view of the park lock mechanism of FIG. 1 in the disengaged position;

DETAILED DESCRIPTION OF THE PREFERRED EMBODIMENT

Figure 1:
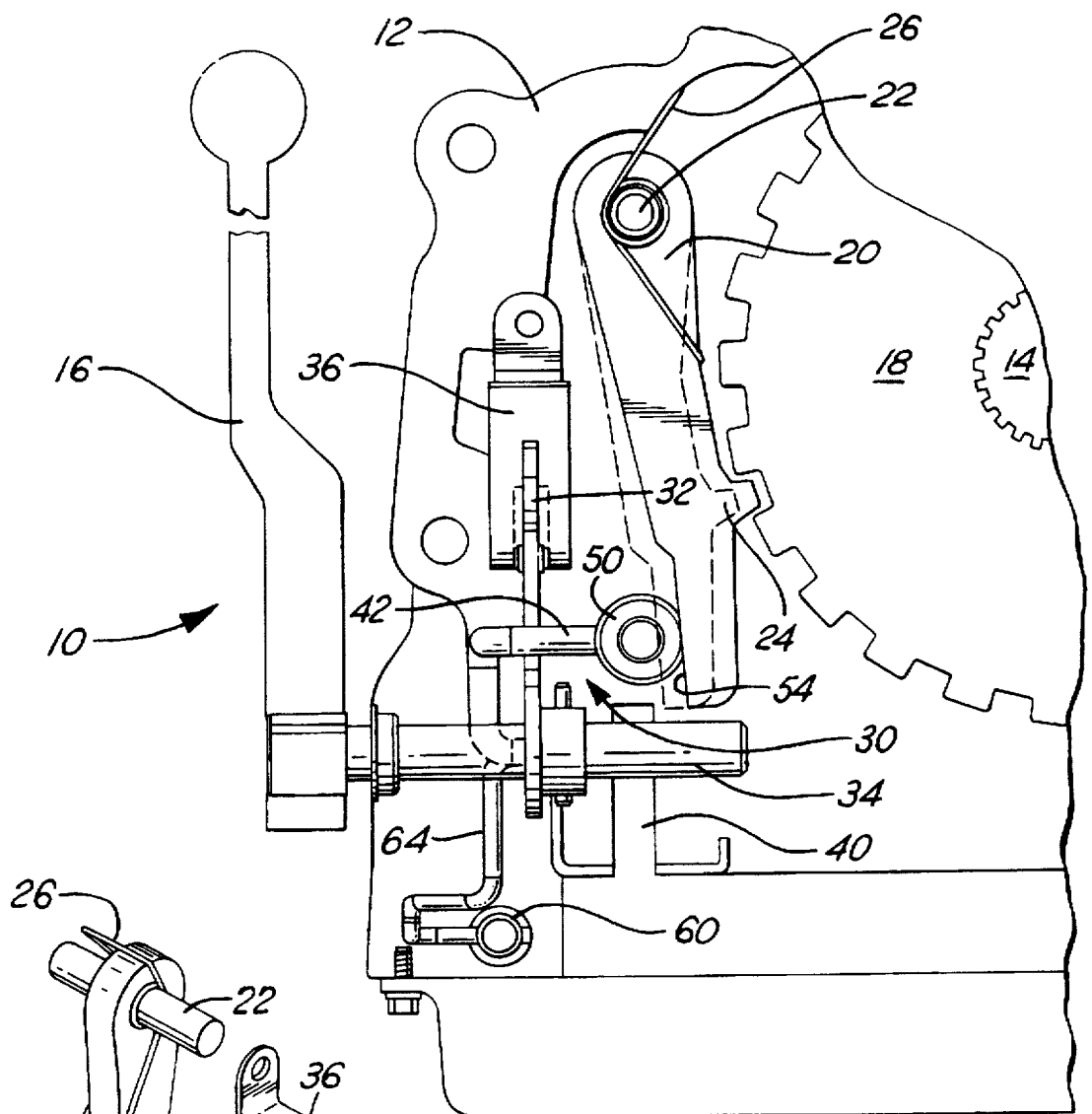
FIG. 1 is a cross sectional view of an automatic transmission having a park lock mechanism according to the present invention.

Turning now to the figures, and in particular to FIG. 1, an automatic transmission 10 includes a transmission housing 12 with an output shaft 14 rotatably mounted therein. The output shaft 14 is coupled to an engine to transmit power from the engine to the drive wheels of the vehicle. Gear ratio shift lever 16, extending into the passenger compartment of the vehicle, is attached to the transmission 10 for selectively effecting a plurality of gear ratios and for selectively engaging and disengaging a park gear 18 mounted on the output shaft 14. The park gear 18 may be fixed to the output shaft 14 by splines, keys or any other suitable means known to those skilled in the art and suggested by this disclosure.

The "Park" position is defined by preventing rotation of the park gear 18 (and subsequently the output shaft 14) relative to the transmission housing 12. To selectively place the transmission 10 in the "Park" position, a park pawl 20 is rotated relative to the transmission housing 12 about a pivot pin 22 or other suitable shaft or fastener, which may be mounted to the housing 12, such that a pawl tooth 24 of the park pawl 20 meshes with the gear teeth on the park gear 18. Park pawl 20 thus moves from the position shown by the dashed line to the position shown by the solid line thereby causing tooth 24 to engage park gear 18. The park pawl 20 is rotated by a park lock mechanism 30 according to the present invention as will be further described hereinafter. In the embodiment described herein, the park pawl 20 is biased relative to transmission housing 12 by spring 26 such that the park pawl 20 is normally biased away from park gear 18 as shown by the dashed line.

As best shown in FIGS. 2 and 3, which show the left side view of the transmission 10 with the park pawl 20 in the engaged and disengaged positions relative to the park gear 18, respectively, the park lock mechanism 30 includes a plate member 32 attached to a manual control shaft 34 extending through transmission housing 12 to which the shift lever 16 (FIG. 1) is attached. It should be noted that in FIG. 3, the transmission housing 12 has been removed for clarity. A series of detents, P, R, N, D, II, I respectively corresponding to the "Park", "Reverse", "Neutral", "Drive", "Second", and "First" positions, of the automatic transmission 10, are formed on the outer surface of the plate number 32. Detent spring 36, such as a leaf spring formed of spring steel, is attached to transmission housing 12. Tab 38 attached to spring 36 engages within detents P, R, N, D, II, I to position the plate member 32 and effect the shift feel and torque of the shift lever 16. The manual control shaft 34 is rotatably mounted to the transmission housing 12 by a bracket member 40 (FIG. 2) extending upward therefrom. Of course, the bracket member 40, may be integrally formed to the transmission housing 12, as shown, or may be a separate bracket attached to the transmission housing 12 by suitable fastening means.

Continuing with reference to FIGS. 2 and 3, a park apply rod 42 is longitudinally disposed between the park pawl 20 and the plate member 32 and is used to rotate the park pawl 20 as will be further described. A first, generally hook shaped end 44 of the park apply rod 42 is disposed and moveable within a slot 46 formed in the plate member 32.

The slot 46 defines a cam portion 48 (see FIG. 3) that causes the park apply rod 42 to move longitudinally a predetermined amount when the plate member 32 rotates due to the action of the shift lever 16. That is, the slot 46 causes the park apply rod to move between an output shaft rotation permitting position and an output shaft rotation preventing position. A cam member 50 is connected to a second, actuation end 52 of the park apply rod 42 longitudinally extending from the first end 44. As the park apply rod 42 moves, depending upon the direction of movement, cam member 50 rides along inclined surface 54 formed on the park pawl 20 through cooperating angled surfaces formed on cam member 50 and inclined surface 54, thereby causing the park pawl 20 to rotate about pivot pin 22.

Referring in particular to FIG. 3, park apply rod 42 moves longitudinally only when plate member 32 moves from "Park" to "Reverse". That is, the movement of park apply rod 42 is provided by the cam portion 48 formed as a step in the plate member slot 46 due to the differing radii $R_1$ and $R_2$. The location of the cam portion 48 corresponds to the location between the "Park" and "Reverse" position and the amount of longitudinal travel (shown as arrows 55 and 56 in FIGS. 2 and 3, respectively) of the park apply rod 42 is defined by the distance between $R_1$ and $R_2$. Accordingly, if more linear travel of the park apply rod 42 is desired, the greater the difference between $R_1$ and $R_2$. Similarly, if less linear travel of the park apply rod 42 is desired, the less the difference between $R_1$ and $R_2$.

Because the amount of longitudinal travel of the park apply rod 42 is limited, (i.e. the distance necessary to actuate the park pawl 20—in this example, that distance is defined by the cam member 50 and the inclined surface 54) the park apply rod 42 need not move when transmission 10 is moved between the "Reverse" and the "First" positions. Thus, $R_2$ remains constant throughout the entire range of rotational motion of the plate member 36 between the "Reverse" and the "First" positions. This feature is referred to as lost motion whereby the only camming action of cam portion 48 takes place between the "Park" and "Reverse" positions as earlier described. To provide this lost motion feature, slot 46 is provided with a lost motion portion 57.

In addition, according to the present invention, the force required to actuate the park pawl 20 with the park gear 18 is partly defined by the slope or angle of the cam portion 48 between $R_1$ and $R_2$. A relatively higher force will result with a larger angle of the cam portion 48 and a relatively lower force will result with a smaller angle of the cam portion 48. Thus, by selecting an appropriate angle of the cam portion 48, an appropriate actuation force may be obtained. Those skilled in the art will recognize in view of this disclosure that the angles formed on both cam member 50 and the inclined surface 54 of park pawl 20 will also effect the actuation force of park pawl 20 with park gear 18.

In a preferred embodiment, the cam member 50 is biased toward the park pawl 20 on the second end 52 of the park apply rod 42 by a spring 58. The spring 58 allows the cam member 50 to move relative to the park apply rod 42 in the event that the vehicle is moving while the "Park" position is selected. That is, under normal operating conditions, typically where the vehicle speed is less than 2 mph, park pawl 20 engages the park gear 18 in the manner described above. However, at higher speeds, the pawl tooth 24 cannot engage with the gear teeth on the park gear 18 because of the non-synchronous relationship of pawl tooth 24 and the park gear 18. Thus, this substantial resistance will cause the cam member 50 to remain substantially stationary while the park apply rod 42 is able to move. As a result, "Park" will not be achieved.

The automatic transmission 10 also includes a manual valve 60, such as a spool valve, (see FIG. 2) to redirect hydraulic pressure in a transmission valve body 62 to hydraulically engage the operating gear selected. In a preferred embodiment, the manual valve 60 is controlled in a manner similar to that described with reference to the park lock mechanism 30. The manual valve 60 includes a shaft 64 which is operatively connected to the plate member 32. That is, the end 66 of the shaft 64 is disposed within a slot 68 formed in the plate member 36. As the plate member 32 rotates, the end 66 of the shaft 64 follows the irregular path of slot 68 (which defines a cam) and causes the manual valve 60 to reciprocate in the valve body 62. In this example, the slot 68 defines the "Park" position at one end followed by "Reverse", "Neutral", "Drive", "Second" and "First" positions corresponding to the gear selected.

Figure 5:
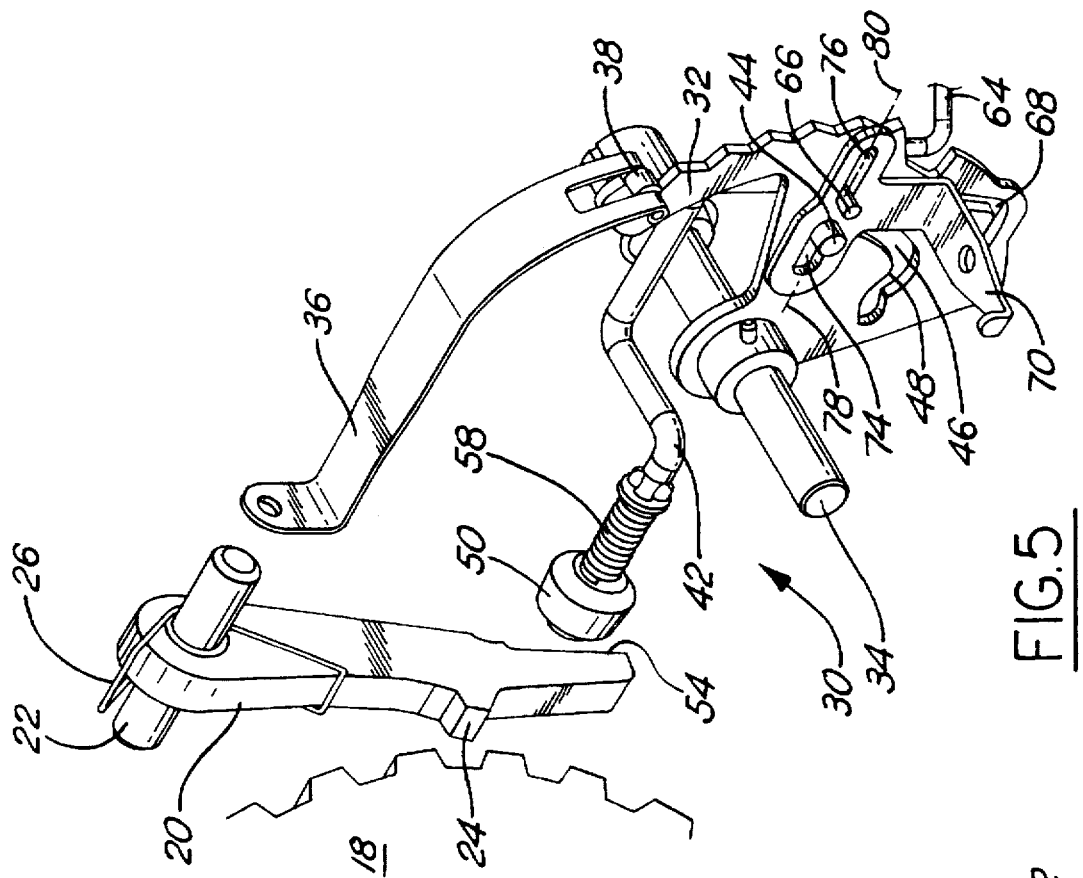
FIG. 5 is a perspective right side view of the park lock mechanism of FIG. 1 in the disengaged position.
Figure 4:
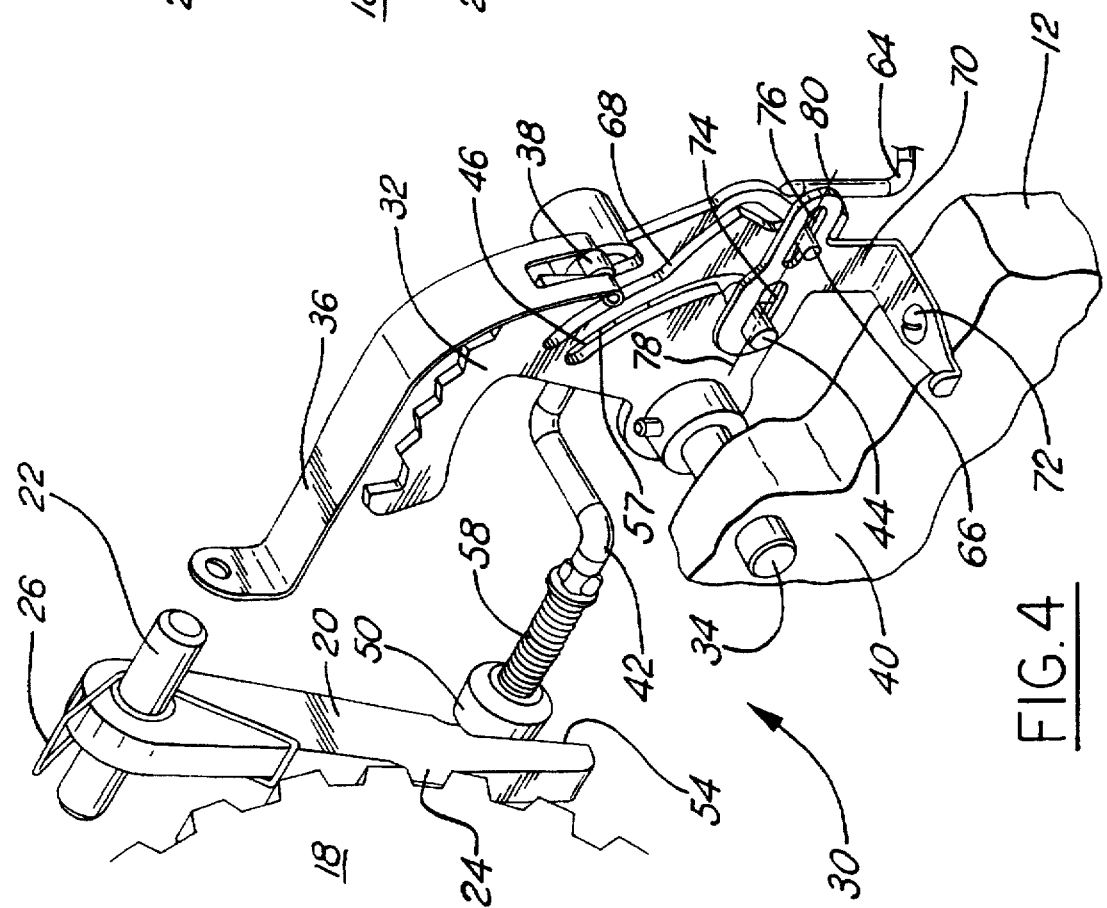
FIG. 4 is a perspective right side view of the park lock mechanism of FIG. 1 in the engaged position.

Referring now to FIGS. 4 and 5, the right side view of the park lock mechanism 30 according to the present invention is shown. In FIG. 4, the park lock mechanism 30 is shown in the engaged or "Park" position whereas in FIG. 5, the park lock mechanism 30 is shown in the disengaged position. For the sake of clarity, most of the transmission housing 12 has been removed from FIG. 4 and all of the transmission housing 12 has been removed from FIG. 5. According to the present invention, as shown in FIG. 4, a reaction bracket member 70, used to limit the degrees of freedom of movement of the park apply rod 42, is fixed to the transmission housing 12 by suitable fastening means such as a bolt 72. The reaction bracket member 70 is formed with a first slot 74 for receiving the second end 44 of the park apply rod 42. Slot 74 constrains movement of the park apply park rod 42 in the longitudinal direction only. That is, the park apply rod 42 is effectively prevented from pivoting about cam member 50. The reaction bracket member 70 also includes slot 76 for controlling the manual valve shaft 64 in a manner similar to that described with reference to the park apply rod 42. As can be seen by comparing FIGS. 4 and 5, the ends 44 and 66 of the park apply rod 42 and the manual valve shaft 64, respectively, move along the longitudinal axes 78, 80 of the respective slots 74, 76. Axes 78, 80 are parallel to the desired longitudinal movement of the park apply rod 42 and manual valve shaft 64, respectively. Thus, the park apply rod 42 and the manual valve shaft 64 are constrained to move in a longitudinal direction only. Those skilled in the art will recognize in view of this disclosure that the length of slots 74 and 76 are greater than the maximum distance traveled by park apply rod 42 and the manual valve shaft 64, respectively. Thus, the necessary longitudinal movement of the park apply rod 42 and the manual valve shaft 64 is maintained.

Figure 6:
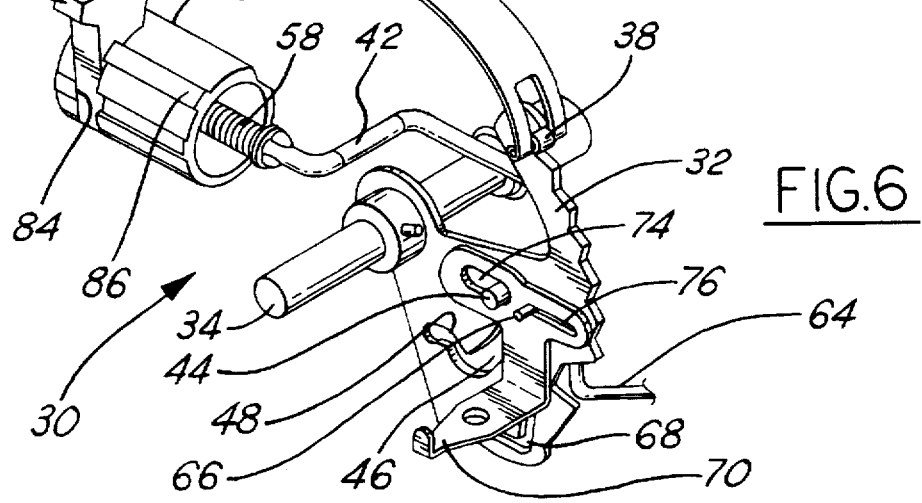
FIG. 6 is a perspective left side view of a preferred embodiment of the park lock mechanism according to the present invention.

Referring now to FIG. 6, in an alternative embodiment, the cam member 50 (not shown) is disposed within a guide member 82. The guide member 82 positions the first end 52 of the park apply rod 42 and the cam member 50 relative to the park pawl 20. Thus, the park apply rod 42 is constrained at both ends first by the slot 74 in the bracket member 70 and the slot 46 in the plate member 32 and second by the guide member 82. The guide member 82 is a hollow cylindrical member having a groove 84 formed in a side wall 86. The park pawl 20 is disposed within the groove 84 such that the park pawl 20 is constrained to move in a direction perpendicular to the output shaft 14 (not shown).

While the best mode for carrying out the invention has been described in detail, those skilled in the art in which this invention relates will recognize various alternative designs and embodiments, including those mentioned above, in practicing the invention that has been defined by the following claims.

We claim:

1. A park lock mechanism for an automatic transmission, with the transmission having a housing, an output shaft rotatably disposed partially within the housing, and a park pawl mechanism operatively connectable with and selectively actuatable by said park lock mechanism; with said park lock mechanism selectively permitting or preventing rotation of the output shaft, said park lock mechanism comprising:

a park apply rod adapted to be longitudinally movable disposed within the housing for silectively actuating the park pawl mechanism, with said park apply rod having first and second ends;

a plate member adapted to be rotatably mounted within the housing and operatively connectable with said park apply rod, said plate member having a cam portion and a lost motion portion, each selectively engageable with said park apply rod upon rotation of said plate member for permitting or preventing rotation of the output shaft, respectively, such that, as said plate member moves upon rotation of said plate member, said cam portion is operative to drive said park apply rod longitudinally and upon further rotation of said plate member, said lost motion portion is operative to prevent said plate member from driving said park apply rod;

a reaction bracket member adapted to be fixed to the housing, with said bracket having a slot formed therein, with said first end of said park apply rod being disposed and moveable within said slot, thereby constraining said park apply rod to longitudinal movement; and, a guide member fixed relative to the transmission housing, said guide member positioning said cam member relative to said park pawl mechanism, with said cam member being constrained exclusively to longitudinal movement.

2. A park lock mechanism according to claim 1 wherein said plate member comprises a plate member slot formed therein, with said plate member slot defining said cam portion and said lost motion portion.

3. A park lock mechanism according to claim 1 wherein said first end of said park apply rod is actuatable by said plate member, said park apply rod having a cam member attached to said second end and operatively connectable with the park pawl mechanism for selectively actuating said park pawl mechanism.

4. A park lock mechanism according to claim 1 wherein said park pawl mechanism includes a park pawl and wherein said guide member includes a generally cylindrical hollow member having a groove formed in a sidewall thereof for receiving said park pawl.

5. An automatic transmission for a motor vehicle comprising:

a housing;

a shift lever for shifting the transmission between a plurality of gear ratios;

an output shaft rotatably disposed at least partially within said housing;

a park gear fixed relative to said output shaft to rotate therewith;

a park pawl selectively movably operable between a first, engaged position with said park gear and a second, disengaged position with said park gear thereby preventing or permitting rotation of said park gear, respectively, said park pawl having a cam surface;

a park apply rod longitudinally movably disposed within said housing and having first and second ends, said park apply rod having a cam member attached to said second end and operatively connectable with said cam surface of said park pawl for selectively actuating said park pawl so as to move said park pawl between said first and said second positions;

a plate member rotatably mounted within said housing and connected to said shift lever, said plate member having a plate member slot formed therein, said first end of said park apply rod being disposed and movable within said plate member slot, said slot defining a cam portion and a lost motion portion, each selectively engageable with said park apply rod upon rotation of said plate member for permitting or preventing rotation of the output shaft, respectively, such that as said plate member moves upon rotation thereof, said cam portion is operative to drive said park apply rod longitudinally and upon further rotation of said plate member, said lost motion portion is operative to prevent said plate member from driving said park apply rod;

a reaction bracket fixed to said housing for limiting the degrees of freedom of movement of said park apply rod relative to said plate member slot, said reaction bracket having a reaction bracket slot formed therein, said first end of said park apply rod being disposed and moveable within said reaction bracket slot;

a guide member fixed relative to said housing, said guide member positioning said cam member relative to said park pawl, with said cam member thereby being constrained exclusively to longitudinal movement.

6. A transmission according to claim 5 wherein said reaction bracket slot defines an axis, said axis being substantially parallel to the direction of motion of said park apply rod such that said park apply rod is constrained to longitudinal movement.

7. A transmission according to claim 5 wherein said park pawl is biased in said second, disengaged position.

8. A transmission according to claim 5 wherein said guide member comprises a generally cylindrical hollow member having a groove formed in a sidewall thereof for receiving said cam surface of said park pawl.

* * * * *